(12) United States Patent
Schlesinger et al.

(10) Patent No.: US 11,317,241 B2
(45) Date of Patent: *Apr. 26, 2022

(54) UNDESIRABLE ENCOUNTER AVOIDANCE

(71) Applicant: MICROSOFT TECHNOLOGY LICENSING, LLC, Redmond, WA (US)

(72) Inventors: Benny Schlesinger, Ramat Hasharon (IL); Yuval Borsutsky, Rishon Le Tsiyon (IL); Keren Damari, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/067,136

(22) Filed: Oct. 9, 2020

(65) Prior Publication Data

US 2021/0029495 A1  Jan. 28, 2021

Related U.S. Application Data

(63) Continuation of application No. 16/421,100, filed on May 23, 2019, now Pat. No. 10,834,530, which is a continuation of application No. 16/142,963, filed on Sep. 26, 2018, now Pat. No. 10,349,217, which is a
(Continued)

(51) Int. Cl.
*H04W 4/02* (2018.01)
*G01C 21/34* (2006.01)
*H04W 4/029* (2018.01)
*G01S 19/39* (2010.01)

(52) U.S. Cl.
CPC ........ *H04W 4/023* (2013.01); *G01C 21/3415* (2013.01); *G01C 21/3484* (2013.01); *G01S 19/393* (2019.08); *H04W 4/029* (2018.02)

(58) Field of Classification Search
None
See application file for complete search history.

(56) References Cited

U.S. PATENT DOCUMENTS 10,834,530 B2 * 11/2020 Schlesinger .......... H04W 4/023
2012/0302256 A1 * 11/2012 Pai ........................ G01S 5/0072
455/456.2
(Continued)

*Primary Examiner* — Alex Skripnikov
(74) *Attorney, Agent, or Firm* — Shook, Hardy and Bacon, L.L.P.

(57) ABSTRACT

A method disclosed herein for allows users to avoid such undesirable encounters by determining whether an undesirable contact of the user has opted for sharing location information, in response to determining that the undesirable contact has opted for sharing location information, collecting location signal from the undesirable contact, forecasting anticipated locations of the undesirable contact over a period based on the location signal of the undesirable contact, forecasting anticipated locations of the user over the period, determining potential of encounter between the user and the undesirable contact based on analysis of anticipated locations of the user and the anticipated locations of the undesirable contact over the period, generating an undesirable contact avoidance scheme based on the potential of encounter, and optionally notifying the user of the undesirable contact avoidance scheme.

20 Claims, 6 Drawing Sheets

Related U.S. Application Data continuation of application No. 15/623,155, filed on Jun. 14, 2017, now Pat. No. 10,117,054.

(56) References Cited

U.S. PATENT DOCUMENTS

| | | | | |
|---|---|---|---|---|
| 2014/0282040 A1* | 9/2014 | Alfaro | ............. | H04L 51/20 |
| | | | | 715/739 |
| 2015/0141060 A1* | 5/2015 | Shan | ............. | H04W 4/023 |
| | | | | 455/456.3 |
| 2015/0304437 A1* | 10/2015 | Vaccari | ............. | H04W 4/027 |
| | | | | 709/204 |
| 2017/0019768 A1* | 1/2017 | Yoon | ............. | H04L 69/28 |
| 2017/0329790 A1* | 11/2017 | Johns | ............. | G06Q 50/16 |
| 2017/0358033 A1* | 12/2017 | Montoya | ............. | H04L 67/18 |

* cited by examiner

UNDESIRABLE ENCOUNTER AVOIDANCE

CROSS-REFERENCE TO RELATED APPLICATIONS

This application is a continuation of U.S. patent application Ser. No. 16/421,100, filed May 23, 2019, titled "UNDESIRABLE ENCOUNTER AVOIDANCE" which is a continuation of U.S. patent application Ser. No. 16/142,963, filed Sep. 26, 2018, titled "UNDESIRABLE ENCOUNTER AVOIDANCE," now U.S. Pat. No. 10,349,217, issued Jul. 9, 2019, which is a continuation of U.S. Non-Provisional application Ser. No. 15/623,155 titled "UNDESIRABLE ENCOUNTER AVOIDANCE" and filed on Jun. 14, 2017, now U.S. Pat. No. 10,117,054, issued Oct. 30, 2018, all of which are incorporated by reference herein in their entireties.

BACKGROUND

In today's increasingly connected world, a person's current location at is widely shared by various mobile apps and devices. As a result, a person's current location may be easily available to other users, including other users that are in the social network of the person. While such capability to share current location may be generally looked upon as beneficial, it also presents opportunity for other users to run into planned or unplanned encounters with a person, even when that person is not interested in such encounters or when that person is trying to actively avoid certain other users.

SUMMARY

Implementations described herein disclose a method of avoiding undesirable encounters with other people by determining whether an undesirable contact of the user has opted for sharing location information, in response to determining that the undesirable contact has opted for sharing location information, collecting a location signal from the undesirable contact, forecasting anticipated locations of the undesirable contact over a period based on the location signal of the undesirable contact, forecasting anticipated locations of the user over the period, determining a potential of encounter between the user and the undesirable contact based on analysis of anticipated locations of the user and the anticipated locations of the undesirable contact over the period, generating an undesirable contact avoidance scheme based on the potential of encounter, and optionally notifying the user of the undesirable contact avoidance scheme.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTION

Figure 1:
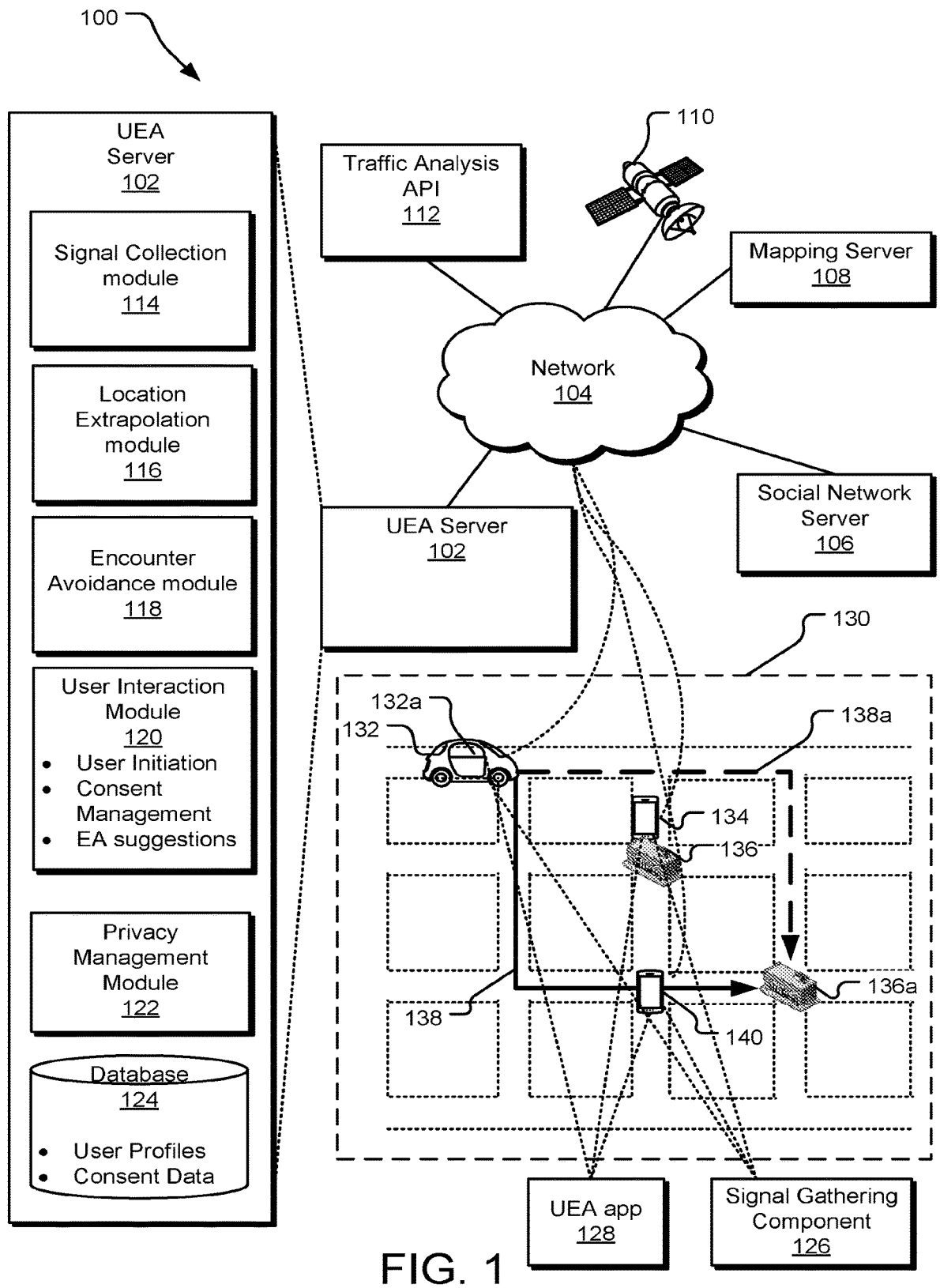
FIG. 1 illustrates an example implementation of a system that allows users to avoid undesirable encounters.

The advances in the telecommunication, computing, and wireless technologies have resulted in capabilities for users to interact with other people using a large number of applications. Specifically, the advances in the mobile device technologies such as wireless networks and global positioning system (GPS) networks results in users being able to determine location of other people such as their friends and families. For example, smartphone apps allow users to find out if a friend or a family member is at a given location of interest such as a restaurant or within a certain range of the user.

For example, a user Alice using a smartphone can determine if any of her friends Bart, Chris, Doug, and Emily are within a mile from Alice's current location. Alternatively, if Alice is going to a café called Coffee Palace, she can find out if any of Bart, Chris, Doug, and Emily are at the Coffee Palace. Furthermore, Alice may also be able to find out if any of Bart, Chris, Doug, and Emily have any plans to go to the Coffee Palace in next few hours or so. Such information about the current or future locations may be gathered based on the GPS system communicating with the mobile devices of these friends or based on analysis of various personal graphs of these friends, such as personal graphs generated based on their social network postings, their calendars, etc.

Such capability to determine potential location of the friends may be very useful for Alice if she is interested in seeing any of Bart, Chris, Doug, and Emily. However, there may be situations where Alice is not interested in meeting one of them. For example, Alice may have recently ended a bad breakup with Bart, in which case Alice may be interested in avoiding any potential encounter with Bart. One way for Alice to accomplish this may be constantly monitor any available information about Bart. However, Alice may not have access to all such information, especially when Alice and Bart may be not connected by any network subsequent to the breakup. Alternatively, Alice may simply walk away when she spots Bart. However, in such a case Bart may still notice Alice and may try to approach her, making up an odd encounter. The system disclosed herein provides various implementations that allow Alice to avoid such undesirable encounters with Bart, or any other people.

Specifically, the system for avoiding undesirable encounters with other people disclosed herein allows any user, such as Alice, to avoid such undesirable encounters by determining whether an undesirable contact of the user has opted for sharing location information, in response to determining that the undesirable contact has opted for sharing location information, collecting location signal from the undesirable contact, forecasting anticipated locations of the undesirable contact over a period based on the location signal of the undesirable contact, forecasting anticipated locations of the user over the period, determining potential of encounter between the user and the undesirable contact based on analysis of anticipated locations of the user and the anticipated locations of the undesirable contact over the period, generating an undesirable contact avoidance scheme based on the potential of encounter, and notifying the user of the undesirable contact avoidance scheme.

FIG. 1 illustrates an example implementation of an undesirable encounter avoidance (UEA) system 100 that allows a user to avoid running into various selected people that the user is trying to avoid without compromising the privacy of the user or such other people. For example, by using the UEA system 100, Alice can avoid running into Bart, or any other persons. Specifically, in one implementation, the UEA system 100 allows Alice to avoid running into Bart if Bart has consented to participate in use of the UEA system 100. In yet alternative implementation, the UEA system 100 allows Alice to avoid running into Bart without knowing the location of Bart.

The UEA system 100 includes a UEA server 102 that is configured to communicate with various information sources, users, and other components via a network 104. For example, such network 104 may be the Internet. One such source of information may be a social network server 106 that manages one or more social networks. Note that while only one social network server 106 is illustrated in FIG. 1, alternative implementations may include a large number of social networks that the UEA server 102 communicates to gather information about users. For example, such social networks may include social networks that allow users to connect with their friends and family, a social network that allows users to network with their professional network, a social network for posting locations, photographs, etc. In one implementation, the UEA server 102 collects information about various people that the user may be interested in avoiding.

The UEA application server 102 also interacts with a mapping server 108 that provides mapping information, such as city maps, locations of restaurants, locations of various users. FIG. 1 illustrates such a map segment 150 including locations of various users and locations. A GPS satellite 110 may provide GPS data to various applications and the users. A traffic analysis API 112 may interact with the mapping server 108, the satellite 110, and various other data sources to determine traffic information in various different locations on the map segment 150 presented by the mapping server.

Specifically, the map segment 130 may be disclosing location of Alice, who is traveling using the vehicle 132 to the Coffee Palace 136. The UEA system 100 may determine that Bart is at the Coffee Palace 136 or is going to be at the Coffee Palace 136 in the near future, based on data collected from Bart's mobile phone 134. In such a case, the UEA system 100 may find an alternate Café, such as the Donut Palace 136a and recommend Alice to go to the Donut Palace 136a instead of the Coffee Palace 136. If Alice approves such alternative destination, the UEA system 100 may suggest a route 138 to Alice to go to the Donut Palace 136a. However, if the UEA system 100 determines that another user, say Doug 140 is near the route 138 and if Alice has also requested to avoid Doug, who is using a tablet 140, the UEA system 100 suggests yet alternate route 138a to Alice to go to the Donut Palace 136a. The UEA system 100 provides these and other capabilities to Alice and other users using one or more of the modules on the UEA server 102 as discussed below.

The UEA server 102 includes a signal collection module 114 that collects various information about users. For example, such information includes user location information collected from signal gathering components 126 on user devices, such as Bart's mobile phone 134, Doug's tablet 140. The signal gathering components 126 may verify if the user has consented to participate in the UEA system 100 and if the user has consented to share its location information with the UEA server 102. Upon determining such participation and consent, the signal gathering components 126 may upload location information to the signal gathering module 114.

In one implementation, the frequency at which the signal gathering components 126 uploads the location information to the signal gathering module 114 may depend upon user input, the available battery power on the user device, the location of the user with respect to other people—specifically the people that the user is trying to void, the direction and/or the speed of the user, etc. For example, for Alice travelling using the vehicle 132, when she gets close to Bart at the Coffee Palace 136, the signal gathering component 126 may increase the frequency at which it uploads the location information. In an alternative implementation, when Alice's vehicle 132 gets close to Bart, the UEA system 100 may send a signal to the signal gathering component 126 on Bart's mobile phone 136 and as a result, the signal gathering component 126 on Bart's mobile phone 136 may also increase the frequency of uploading the location information to the signal collection module 114.

The UEA server 102 may also include a location extrapolation module 116 that uses the location information collected at the signal collection module 114 to determine current and potential locations of various participants. In one implementation, the location extrapolation module 116 may use the speed at which a user is moving, speeds at which people that may result in undesirable encounter with the user, calendars of various users, etc., to extrapolate location information. For example, if Alice has elected to avoid encounters with Bart, the location extrapolation module 116 may analyze the calendar information from Bart's calendar to see where Bart is supposed to be during various time periods. If there are multiple people that a user is trying to avoid, location information about each of these people may be extrapolated by the location extrapolation module 116. The time window for which such location information is extrapolated may be determined based on user input, speed of user, etc. In one implementation, the location extrapolation module 116 may extrapolate location information for a given user and each of the people that the given user is trying to avoid for a period of two hours and updates such two-hour window for locations at a predetermined frequency of every ten minutes. For example, if Alice has elected to avoid Bart and Doug, the location extrapolation module 116 may extrapolate two-hour location information for each of Alice, Bart, and Doug and update such two-hour location information every ten minutes.

The UEA server 102 also includes an encounter avoidance module 118 that analyzes the location information of various people for various time periods to determine if any of the people that a user is trying to avoid overlaps with the user at any location. In the above example where Alice is trying to avoid Bart and Doug, the encounter avoidance module 118 analyzes the two-hour location information for each of Alice, Bart, and Doug to determine any potential encounter between Alice and Bart or Alice and Doug. For example, if at 12:00 Alice's extrapolated to be at the Coffee Palace 136 at 12:30 to 13:30 PM, Bart is expected to be at the Coffee Palace 136 between 12:00 and 1:30, and Doug is expected to be on the route 138 at 12:15, at 12:00, the encounter avoidance module 118 may determine to suggest Alice to go to the Donut Palace 136a using route 138a, so as to avoid potential encounters with Bart and Doug.

A user interaction module 120 of the UEA server 102 may work with a UEA app 128 based on the mobile devices of users to communicate with the user's. For example, such UEA app 128 may be installed at the user's request on their mobile devices, such Alice's mobile device 132a, Bart's mobile phone 134, Doug's table 140, etc. The user interaction module 120 may communicate with users to initiate their participation in the UEA system 100. For example, after hearing about the availability of the UEA app 128 Alice may install it on her mobile device 132a. After the installation, using a UEA user interface, Alice may request that she wants to avoid encounters with Bart and Doug. As part of these request, Alice may provide some identifying information about Bart and Doug, such as their mobile device numbers, their social network identifications, etc.

Upon receiving the identifying information about Bart and Doug, the user interaction module 120 communicates with Bart and Doug to request them to join the UEA system or to simply receive their consent. For example, the user interaction module 120 may communicate with Bart and Doug via a text message, via a message on their social app, an email, etc. As an example, the user interaction module 120 may send a text message to invite them to download the UEA app 128 on their mobile device. Alternatively, the user interaction module 120 may send them a text message to inform that a user of the UEA system 100 has requested avoiding encounters with them without giving them the identity of such user. If any of Bart or Doug gives such consent, the user interaction module 120 may send a message to Alice to inform her that at least one person that she has requested for encounter avoidance has consented to her request.

Once Alice's account is set up to have encounter avoidance with various users, the user interaction module 120 may also interact with the use, their mobile device, or one or more applications running on their mobile device to effectuate such encounter avoidance. For example, if Alice is using a navigation application on her mobile device 132a, upon detecting potential encounter with Bart, the user interaction module 120 may interact with such navigation application to suggest an alternative destination, an alternative route, etc.

A privacy management module 122 of the UEA server 102 manages the privacy of various participants of the UEA system 100. Specifically, the privacy management module 122 ensures that location of an individual user not exposed to other users. Thus, it ensures that the UEA system 100 is not used by any user to locate other users, thus avoiding the potential of a user stalking or following another user. In one implementation, to achieve such privacy, the privacy management module 122 requires that when a user initiates their participation in the UEA system 100, they include at least a significant number of individual users that they want to avoid within a given geographic region. For example, when Alice signs up to use the UEA system 100 to avoid encounters with Bart and Doug, she is required to identify a significant number of users in the geographic area where each of Bart and Doug are located so that when Alice receives a signal about a potential undesired encounter, she cannot infer the identity of the person related to the potential undesired encounter. In an alternative implementation, Alice does not receive any signal about the potential undesired encounter and she is automatically redirected to alternative location or route. Furthermore, Alice may be able to set the UEA system for herself such that she can decide whether she wants to receive a signal about an undesirable encounter or whether she would prefer to be automatically redirected without knowledge about the potential encounters. In an example implementation, Alice is requested to identify at least five users.

In an alternative implementation, the privacy management module 122 randomly selects a predetermined number of users to the pool of users avoided so as to ensure that location of any individual user is not exposed. Thus, if Alice requests that she wants to avoid Bart and Doug, the privacy management module 122 randomly selects a few additional users as well where Alice would also be notified to avoid encounter with these additional users. For example, the additional users may be auto-generated fake users and generate fake encounters. The privacy management module 122 also notifies Alice that she is going to receive notifications when she is likely to encounter users other than Bart and Doug as well. As a result, when Alice receives a notification about a potential encounter she cannot infer for sure who such potential encounter may be. In one implementation, the privacy management module 122 includes such random users such that for any geographical area, there are at least five users that Alice may be avoiding.

A database 124 of the UEA server 102 stores various information about the users, such as user profiles, user consent data. In one implementation, the database 124 may also store previous usage patterns of the users such as the users' acceptance of suggestions for encounter avoidance, etc., to further refine generating the encounter avoidance notifications. For example, if a user is more likely to reject a suggestion when it adds significant commute time, the encounter avoidance module 118 may use such preference pattern to modify future suggestion generation.

Figure 2:
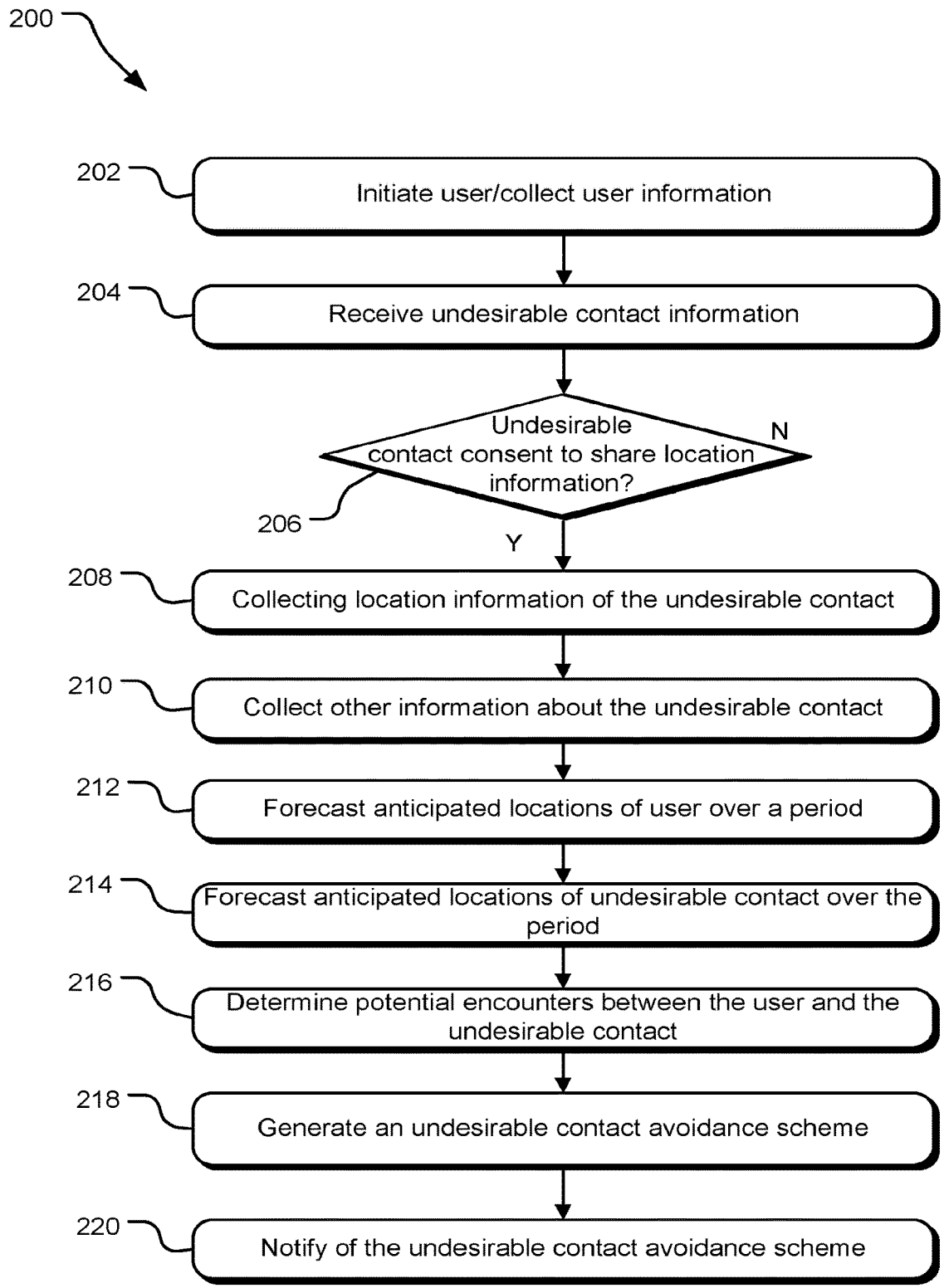
FIG. 2 illustrates example operations that allows users to avoid undesirable encounters.

FIG. 2 illustrates example operations 200 that allows users to avoid undesirable encounters. Various operations 200 may be stored on a computer readable memory of a computing device, such as a cloud based server, and implemented by a processor. Specifically, the operations 200 provides a user an undesirable encounter avoidance scheme that would allow the user to avoid an undesirable encounter with one or more selected users. An operation 202 initiates a user in a UEA system (such as the UEA system 100 of FIG. 1). For example, the user may be initiated in the UEA system by installing an app on the user's mobile device, by registering the user online, etc. Furthermore, the operation 202 may also receive other information about the user, such as information from the user's calendar, the user's social graph, the user's professional graph, etc. An operation 204 receives a list of other people identified by the user as undesirable contacts with whom the user would like to avoid undesirable contacts. The user may identify such undesirable contacts by the phone numbers, the email addresses, social network identifiers, etc., of such undesirable contacts.

Subsequently, an operation 206 determines whether an undesirable contact of the user has opted for sharing location information. For example, if the user, Alice, has identified Bart as an undesirable contact, the operation 206 determines if Bart has consented to share location information with the UEA system (such as the UEA system 100 of FIG. 1). Note that the operation 206 may determine whether Bart has consented to share location information with the UEA system at a number of different times. For example, once Alice identifies Bart as an undesirable contact, the UEA system may check to see if Bart has opted into the UEA system at some prior time. Alternatively, the UEA system may periodically check to see if Bart has opted into the UEA system at some later time and in response to Bart's opting in, Bart is added as an active undesirable contact for Alice to effectuate undesirable encounters between Alice and Bart.

If the undesirable contact has consented to such sharing of information, an operation 208 collects location information from the undesirable contact. While the operation 208 is illustrated as a single operation, the collecting of the location information may be repeated at predetermined intervals. Such collection of the location information from the undesirable contact may be optimized based on various parameters such as user device battery life, closeness of the user with respect to the undesirable contact, etc.

An operation 210 collects other information about the undesirable contact, such as calendar information, social graph, etc. Again, the operation 210 collects such other information about the undesirable contact only if the undesirable contact has consented to collection of such information. An operation 212 forecasts anticipated locations of the user over a period. For example, the operation 212 may forecast such anticipated locations over a period of two hours based on calendar of the user, the location and direction of the user, social network discussion of the user, etc.

An operation 214 forecasts anticipated locations of various undesirable contacts over the similar time period. In doing such forecast, the operation 214 may use various information about such undesirable contact, such as their current location, their historic locations, their social and professional graph, their calendar, etc. For example, the operation 214 may take into consideration that when a user takes a particular route, it is generally to visit a certain relative of the user. An operation analyzes the anticipated locations of the undesirable contacts (determined at operation 214) in view of the anticipated location of the user (as determined at operation 212) to determine potential encounters between the user and one or more of the undesirable contacts.

If there is a potential of any undesirable encounter between the user and at least one of the undesirable contacts, an operation 218 generates an undesirable contact avoidance scheme. For example, such an undesirable contact avoidance scheme may be an alternative destination, an alternative route, a change in the schedule of the user, etc. An operation 220 notifies the user of undesirable contact avoidance scheme. In one implementation, such notification may be direct in form of a text message or a message within a UEA app on the user's mobile device. In an alternative implementation, such notification may be via another application, such as a navigation application, a calendar application, etc.

Figure 3:
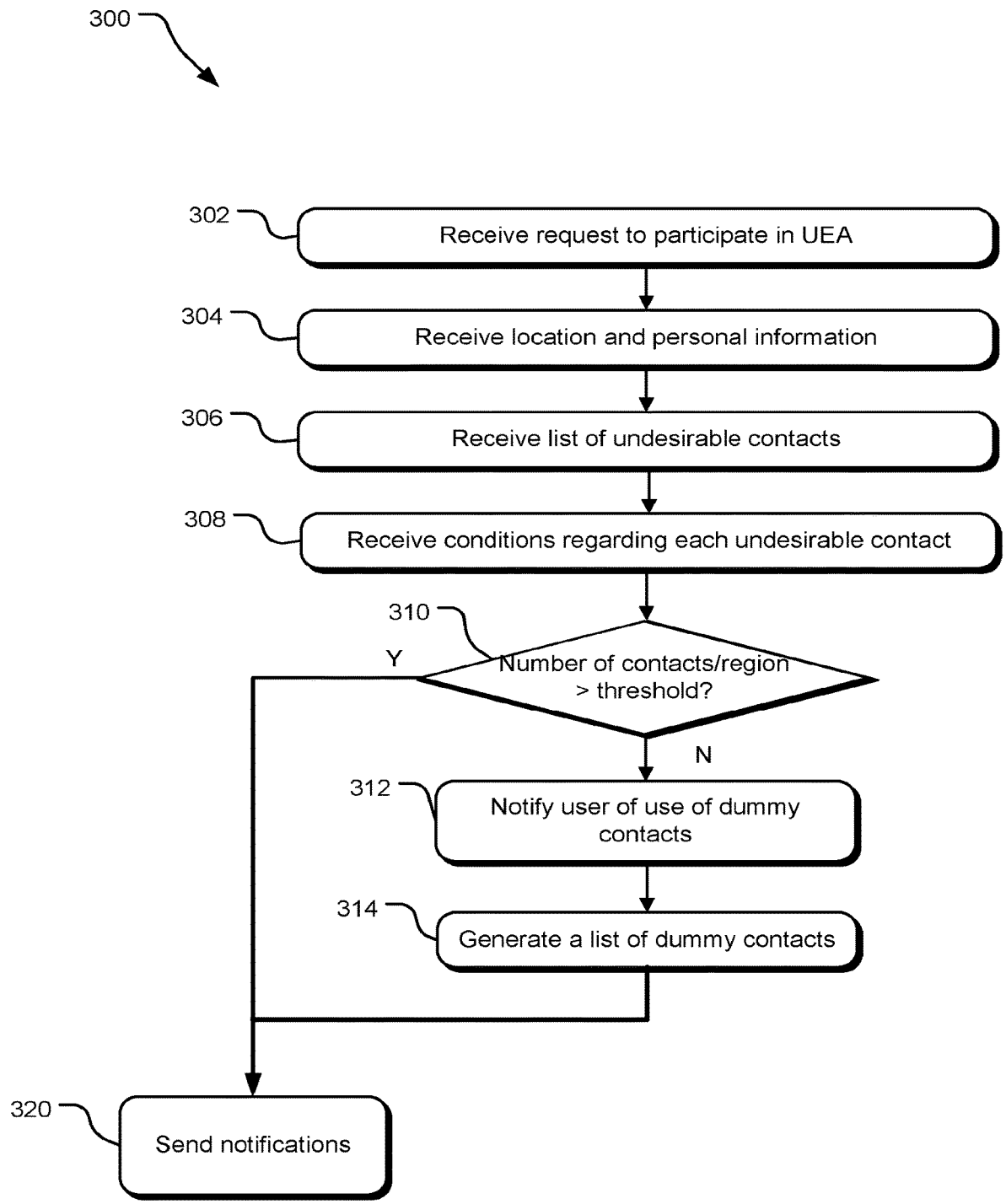
FIG. 3 illustrates example operations to initiate a user's participation in an undesirable encounter avoidance system.

FIG. 3 illustrates example operations 300 to initiate a user's participation in an undesirable encounter avoidance system. Various operations 300 may be stored on a computer readable memory of a computing device, such as a cloud based server, and implemented by a processor. An operation 302 receives a request from a user to participate in the UEA system. For example, the user may download an app on their mobile device to initiate such participation. At an operation 304, the UEA app may receive various parameters of the user in response to downloading of such app. Alternatively, the UEA app may request information such as the location of the user and other personal information of the user via a UEA user interface.

An operation 306 receives a list of undesirable contacts from the user. For example, the user may identify a list of phone numbers from the contact list on the mobile device, a list of members from her social network, etc., as undesirable contacts. Furthermore, an operation 306 receives various conditions related to each of the undesirable contacts. For example, Alice may select to avoid encounters with Bart when Alice and Chris are together. Alternatively, Alice may select to avoid Bart only in the evenings and weekends. Yet alternatively, Alice may select to avoid Doug in locations that sell alcoholic beverages.

An operation 310 determines if the user has provided a significant number of undesirable contacts. Specifically, the operation 310 determines if the user has provided significant number of contacts per given geographic region. This it to ensure the privacy of the undesirable contact. For example, if Alice gives only Bart as the contact to avoid in the Herzliya metro area, any time she receives a notification about a potential undesirable encounter, Alice would be able to infer that Bart is at the desired location. This would compromise Bart's privacy. For example, the threshold number used by operation 310 may be five contacts per metro area. The operation 310 may evaluate the number of contacts at a number of different times, such as upon Alice's initiation in the system or on a periodic basis in the future. For example, when Alice joins the UEA system and identifies certain undesirable contact, such contact may already have opted into the UEA system and would count in meeting the threshold. Alternatively, if such a contact opts into the system in future, at that point the determination of whether dummy contacts is required is reevaluated.

If the number of undesirable contacts is less than the threshold, an operation 312 notifies the user that the UEA system will be using dummy contacts as undesirable contacts. An operation 314 selects such dummy contacts. Alternatively, such dummy contacts may be randomly selected from other users with characteristics similar to one or more of the undesirable contacts identified by the user. As an example, if Alice has selected Bart as one of the undesirable contacts and Bart is more likely to frequent cafés, the operation 314 selects other users, either from contact list of Alice or otherwise, where these other users are also likely to visit Cafés. An operation 320 sends notifications to the undesirable contacts, those identified by the user and those randomly selected to receive their consent to be part of the UEA system.

Figure 4:
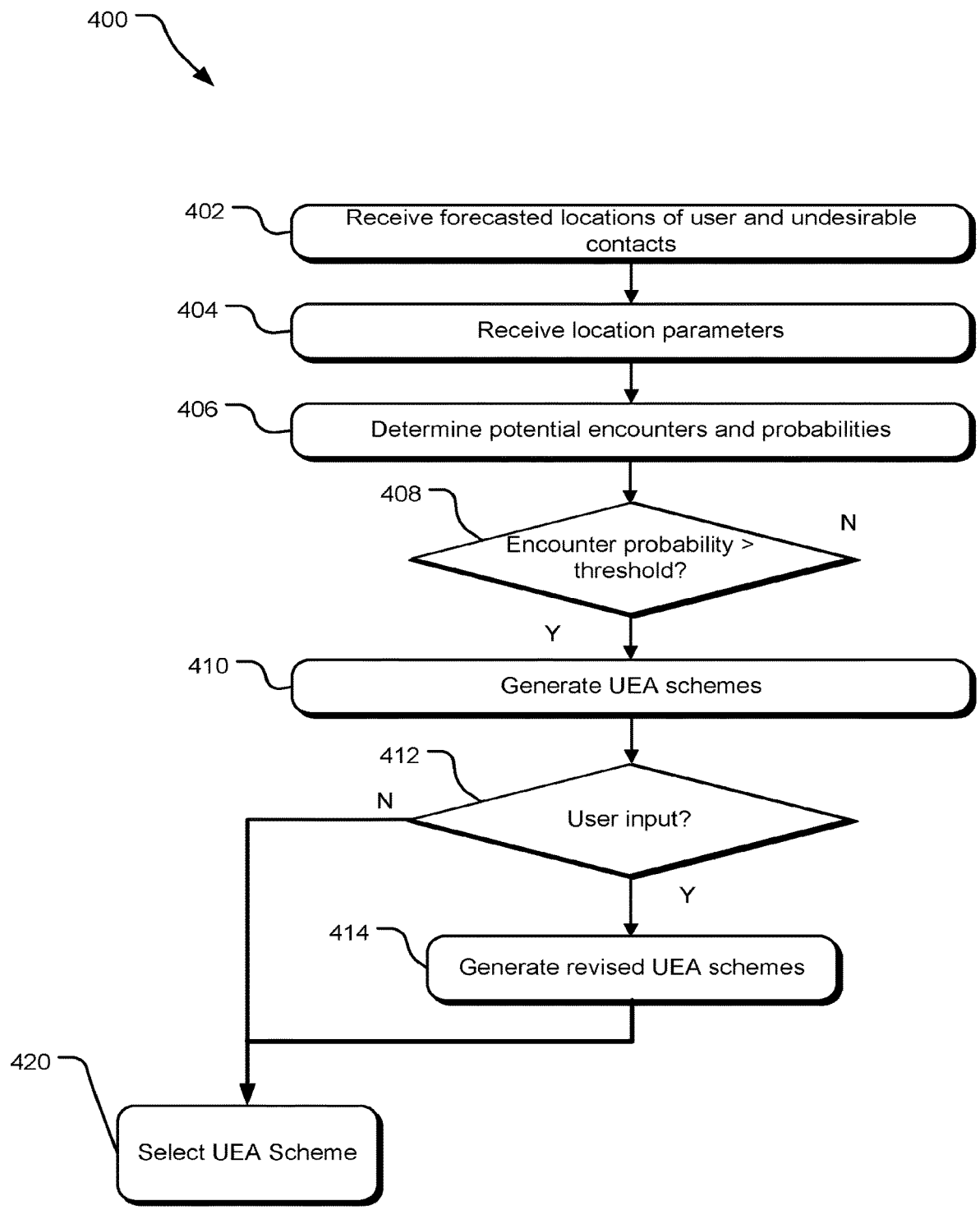
FIG. 4 illustrates alternative example operations to generate various undesirable encounter avoidance schemes.

FIG. 4 illustrates alternative example operations 400 to generate various undesirable encounter avoidance schemes. Various operations 400 may be stored on a computer readable memory of a computing device, such as a cloud based server, and implemented by a processor. An operation 402 receives forecasted locations of the user and the list of undesirable contacts for a given time-period. For example, forecasted locations over a period of two-hours is provided. An operation 404 receives location parameters for various locations identified as potential locations for undesirable encounters between the user and one or more undesirable contacts. Such parameters about the locations may be the size of the location, crowd size at the location, the lighting conditions at the location, noise levels at the location, etc.

An operation 406 evaluates the locations where the user may encounter an undesirable contact in view of these parameters to determine the potential encounters and their probabilities. For example, if it is identified that the user may run into an undesirable contact at a very crowded supermarket with high noise level, the operation 406 may assign a lower probability that the user will actually run into the undesirable contact. An operation 408 evaluates the encounter probability against a threshold to determine if a UEA scheme is appropriate. Such threshold may be given by the user. In one implementation, the user may give different threshold level for different undesirable contacts. For example, Alice may specify that she does not want to run into Bart ever, and even if there is only one percent chance of encounter with Bart, she would rather prefer having an option for a UEA avoidance scheme. On the other hand, Alice may be willing to take chance and not change her itinerary to avoid Doug as long as the probability of such encounter is less than 25 percent.

If it is determined that a UEA is desirable, an operation 410 generates various UEA avoidance schemes. For example, such schemes may be based on alternative destination for the user, an alternative route for the user, a change in scheduled time of visit to the destination, etc. An operation 412 gives the user an option to provide an input in selection of the UEA scheme. For example, such input may be selection of time of visit, selection of route, etc. An operation 414 revises the UEA scheme based on the input. An operation 420 selects the appropriate UEA scheme. The selected UEA scheme may be presented to the user directly of via another application, such as a calendar, a navigation application, etc.

Figure 5:
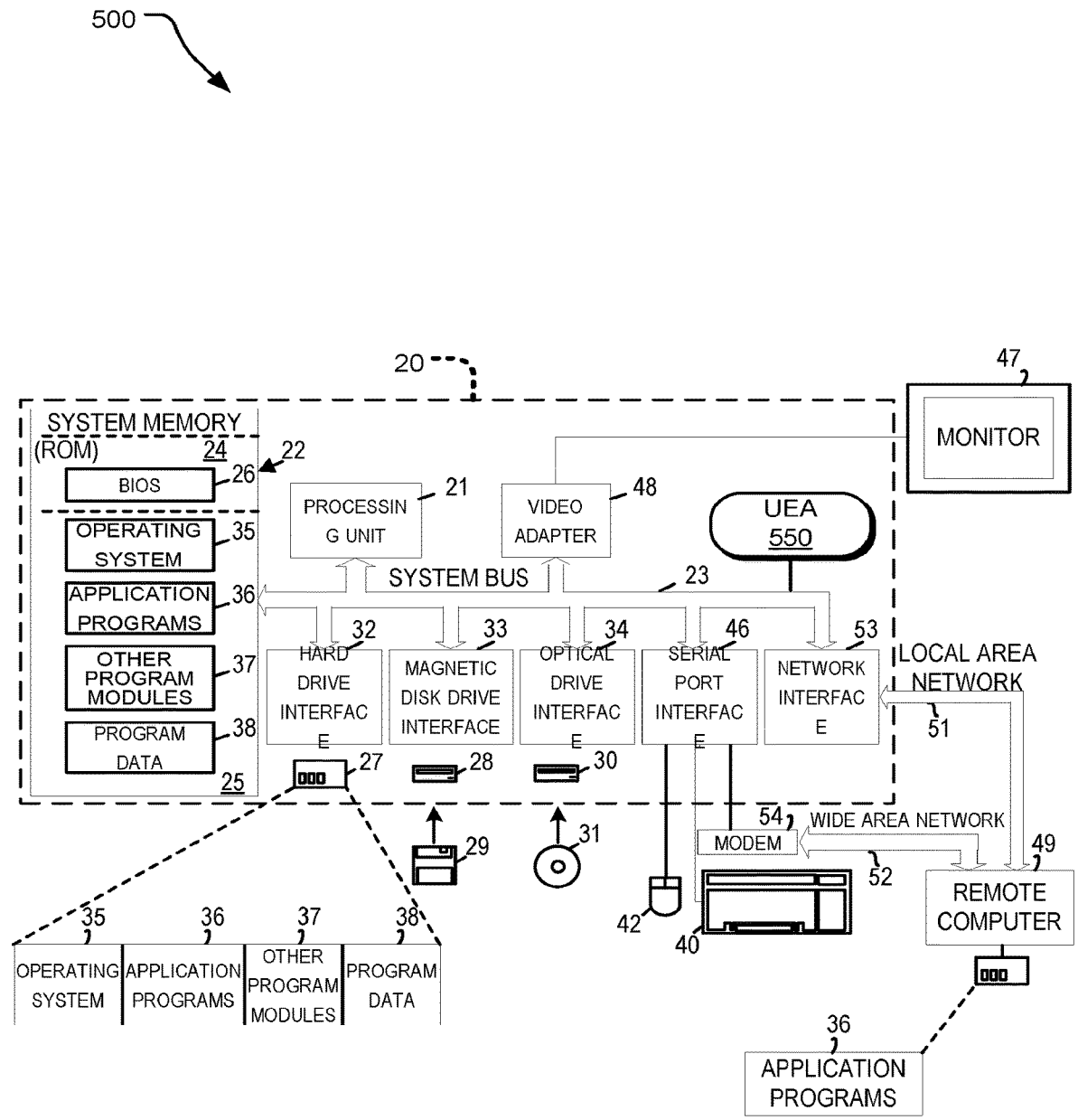
FIG. 5 illustrates an example computing system that may be useful in implementing the described technology for undesirable encounter avoidance system.

FIG. 5 illustrates an example system 500 that may be useful in implementing the UEA system disclosed herein. The example hardware and operating environment of FIG. 5 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of a computer 20 includes a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 500, the computer 20 also includes an UEA module 550 providing one or more functions of the UEA operations disclosed herein. The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RANI) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a signal sampling module configured to generate sampled signals based on the reflected modulated signal 72 as illustrated in FIG. 1. In one implementation, a frequency unwrapping module including instructions to unwrap frequencies based on the sampled reflected modulations signals may be stored in memory of the computer 20, such as the read-only memory (ROM) 24 and random access memory (RAM) 25, etc.

Furthermore, instructions stored on the memory of the computer 20 may be used by a system for delivering personalized user experience. Similarly, instructions stored on the memory of the computer 20 may also be used to implement one or more operations of a personalized user experience delivery system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for requesting, processing, and rendering mapping data may be stored in system memory 22 and/or storage devices 29 or 31 and processed by the processing unit 21. Mapping data and/or layer prioritization scheme data may be stored in system memory 22 and/or storage devices 29 or 31 as persistent data-stores. A UEA module 550 communicatively connected with the processing unit 21 and the memory 22 may enable one or more of the capabilities of the personalized UEA system disclosed herein.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Figure 6:
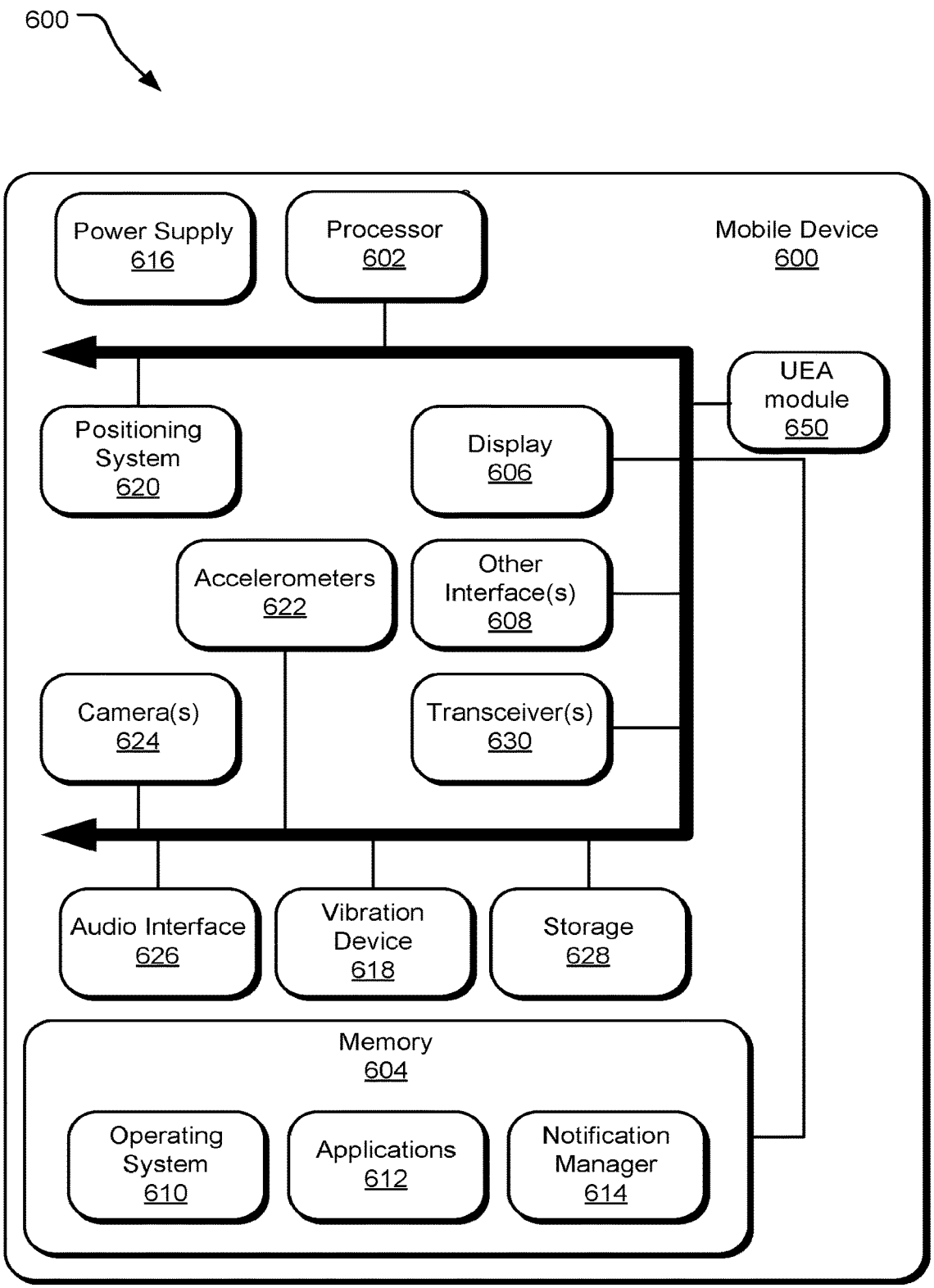
FIG. 6 illustrates an example mobile device that may be useful in implementing the described technology for undesirable encounter avoidance system.

FIG. 6 illustrates another example system (labeled as a mobile device 600) that may be useful in implementing the described technology. The mobile device 600 includes a processor 602, a memory 604, a display 606 (e.g., a touch-screen display), and other interfaces 608 (e.g., a keyboard). The memory 604 generally includes both volatile memory (e.g., RANI) and non-volatile memory (e.g., flash memory). An operating system 610, such as the Microsoft Windows® Phone operating system, resides in the memory 604 and is executed by the processor 602, although it should be understood that other operating systems may be employed.

One or more application programs 612 are loaded in the memory 604 and executed on the operating system 610 by the processor 602. Examples of applications 612 include without limitation email programs, scheduling programs, personal information managers, Internet browsing programs, multimedia player applications, etc. A notification manager 614 is also loaded in the memory 604 and is executed by the processor 602 to present notifications to the user. For example, when a promotion is triggered and presented to the shopper, the notification manager 614 can cause the mobile device 600 to beep or vibrate (via the vibration device 618) and display the promotion on the display 606.

The mobile device 600 includes a power supply 616, which is powered by one or more batteries or other power sources and which provides power to other components of the mobile device 600. The power supply 616 may also be connected to an external power source that overrides or recharges the built-in batteries or other power sources.

The mobile device 600 includes one or more communication transceivers 630 to provide network connectivity (e.g., mobile phone network, Wi-Fi®, BlueTooth®, etc.). The mobile device 600 also includes various other components, such as a positioning system 620 (e.g., a global positioning satellite transceiver), one or more accelerometers 622, one or more cameras 624, an audio interface 626 (e.g., a microphone, an audio amplifier and speaker and/or audio jack), and additional storage 628. Other configurations may also be employed.

In an example implementation, a mobile operating system, various applications, and other modules and services may be embodied by instructions stored in memory 604 and/or storage devices 628 and processed by the processing unit 602. User preferences, service options, and other data may be stored in memory 604 and/or storage devices 628 as persistent datastores. A UEA module 650 communicatively connected with the processor 602 and the memory 604 may enable one or more of the capabilities of the UEA system disclosed herein.

The UEA system disclosed herein provides solution to a technological problem necessitated by allowing users to avoid running into other undesirable contacts using location information of the users and the undesirable contacts and by generating UEA schemes based on projected locations of the users and the undesirable contacts.

A method disclosed herein for allows users to avoid such undesirable encounters by determining whether an undesirable contact of the user has opted for sharing location information, in response to determining that the undesirable contact has opted for sharing location information, collecting location signal from the undesirable contact, forecasting anticipated locations of the undesirable contact over a period based on the location signal of the undesirable contact, forecasting anticipated locations of the user over the period, determining potential of encounter between the user and the undesirable contact based on analysis of anticipated locations of the user and the anticipated locations of the undesirable contact over the period, generating an undesirable contact avoidance scheme based on the potential of encounter, and optionally notifying the user of the undesirable contact avoidance scheme.

In one implementation of the method, notifying the user of the undesirable contact avoidance scheme further comprising notifying the user of the undesirable contact avoidance scheme without disclosing an identity of the undesirable contact. In another implementation, collecting the location signal of the user further includes collecting the location signal based on GPS of a mobile device of the user and collecting the location signal of the undesirable contact further includes collecting the location signal based on GPS of a mobile device of the undesirable contact. Alternatively, forecasting anticipated locations of the user over the period further includes forecasting anticipated locations of the user over the period based on a location signal collected from the user's mobile device.

An implementation of the method to avoid such undesirable encounters further includes determining that the user has provided at least a predetermined number of contacts within a geographic region of the undesirable contact before collecting location signal from the undesirable contact. Another implementation of the method further includes determining that the user has not provided at least a predetermined number of contacts within a geographic region of the undesirable contact and in response to the determination generating a plurality of dummy contacts. Alternatively, determining potential of encounter between the user and the undesirable contact further includes evaluating one or more location parameters of an anticipated encounter location to determine probability of encounter at the anticipated encounter location. Yet alternatively, undesirable encounter avoidance scheme is based on at least one of an alternative destination for the user, an alternative route for the user, and an alternative schedule for the user. In one implementation, notifying the user of the undesirable encounter avoidance scheme further includes notifying a navigation application on a mobile device of the user to alter navigation route.

A physical article of manufacture including one or more tangible computer-readable storage media, encoding computer-executable instructions for executing on a computer system a computer process, the computer process includes in response to determining that an undesirable contact has opted for sharing location information, collecting location signal from the undesirable contact, forecasting anticipated locations of the user over a period, forecasting anticipated locations of the undesirable contact over the period based on the location signal of the undesirable contact, determining potential of encounter between the user and the undesirable contact based on analysis of anticipated locations of the user and the anticipated locations of the undesirable contact over the period, and generating an undesirable encounter avoidance scheme based on the potential of encounter. In one implementation, the computer process further comprising notifying a navigation app of the user's mobile device of the undesirable encounter avoidance scheme.

In an alternative implementation, the computer process of generating an undesirable encounter avoidance scheme based on the potential of encounter further comprising generating an undesirable encounter avoidance scheme based on an alternative destination for the user. Yet alternatively, the computer process of generating an undesirable encounter avoidance scheme based on the potential of encounter further comprising generating an undesirable encounter avoidance scheme based on an alternative navigation route for the user. In another implementation, the computer process of generating an undesirable encounter avoidance scheme based on the potential of encounter further comprising generating an undesirable encounter avoidance scheme based on an alternative schedule for the user. Yet alternatively, the computer process further comprising determining that the user has not provided at least a predetermined number of contacts within a geographic region of the undesirable contact and in response to the determination generating a plurality of dummy contacts.

In an implementation of the physical article of manufacture, the computer process of wherein notifying the user of the undesirable contact avoidance scheme further comprising notifying the user of the undesirable contact avoidance scheme without disclosing an identity of the undesirable contact. Alternatively, the computer process further comprising determining that the user has provided at least a predetermined number of contacts within a geographic region of the undesirable contact before collecting location signal from the undesirable contact.

A system for delivering personalized user experience includes a memory, one or more processor units, a signal collection module stored in the memory and executable by the one or more processor units, the signal collection module configured to collect location signals from a user and a plurality of undesirable contacts, a location extrapolation module configured to determine locations of the user and the plurality of undesirable contacts over a predetermined time period, and an encounter avoidance module configured determine potential of encounter between the user and the undesirable contact based on analysis of anticipated locations of the user and the anticipated locations of the undesirable contact over the period and generate an undesirable encounter avoidance scheme based on the potential of encounter. An implementation of the system further includes a user interaction module configured to interact a navigation app of the user's mobile device of the undesirable encounter avoidance scheme. Another implementation of the system includes a privacy management module configured to determine that the user has not provided at least a predetermined number of contacts within a geographic region of the undesirable contact and in response to the determination generating a plurality of dummy contacts.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

The invention claimed is:

1. A method of allowing a user to avoid unwanted encounters, the method comprising:
    determining whether an undesirable contact of the user has opted for sharing location information;
    in response to determining that the undesirable contact has opted for sharing the location information,
    collecting the location information of the undesirable contact;
    forecasting anticipated locations of the user over a period;
    forecasting anticipated locations of the undesirable contact over the period based on the location information of the undesirable contact;
    determining a potential undesirable encounter at an anticipated location; and
    displaying the anticipated location to the user without disclosing an identity of the undesirable contact.

2. The method of claim 1, the location information of the undesirable contact determined at least in part based on a location signal from the undesirable contact.

3. The method of claim 1, the location information of the undesirable contact determined at least in part based on social network postings of the undesirable contact.

4. The method of claim 1, further comprising determining the potential undesirable encounter based at least in part on analysis of the anticipated locations of the user and the anticipated locations of the undesirable contact over the period.

5. The method of claim 4, the analysis comprising a determination of a potential overlap of at least one anticipated location of the user and at least one anticipated location of the undesirable contact over the period.

6. The method of claim 1, further comprising sending a notification to a mobile device of the user to alter a route, based at least in part on the potential undesirable encounter.

7. The method of claim 6, the notification comprising a notification to a navigation application on the mobile device to alter a navigation route.

8. A physical article of manufacture including one or more devices encoding computer-executable instructions for executing on a computer system a computer process, the computer process comprising:
    receiving from a user a phone number identifying an undesirable contact;
    in response to determining that the undesirable contact has opted for sharing location information, collecting the location information of the undesirable contact;
    forecasting anticipated locations of the user over a period;
    forecasting anticipated locations of the undesirable contact over the period based on the location information of the undesirable contact;
    determining a potential undesirable encounter at an anticipated location; and
    displaying the anticipated location to the user without disclosing an identity of the undesirable contact.

9. The physical article of manufacture of claim 8, the location information of the undesirable contact determined at least in part based on a location signal from the undesirable contact.

10. The physical article of manufacture of claim 8, the location information of the undesirable contact determined at least in part based on social network postings of the undesirable contact.

11. The physical article of manufacture of claim 8, the computer process further comprising determining the potential undesirable encounter based at least in part on analysis of the anticipated locations of the user and the anticipated locations of the undesirable contact over the period.

12. The physical article of manufacture of claim 11, the analysis comprising a determination of a potential overlap of at least one anticipated location of the user and at least one anticipated location of the undesirable contact over the period.

13. The physical article of manufacture of claim 8, the computer process further comprising sending a notification to a mobile device of the user suggesting an alternative destination for the user, based at least in part on the potential undesirable encounter.

14. A system for allowing a user to avoid undesirable encounters, comprising:
  memory;
  one or more processors;
  one or more computer-executable instructions stored in the memory and executable by the one or more processors to:
  collect location information of the user;
  collect location information of an undesirable contact in response to determining that the undesirable contact has opted for sharing the location information;
  determine locations of the user and locations of the undesirable contact over a predetermined period;
  determine a potential undesirable encounter at an anticipated location based on anticipated locations of the user and anticipated locations of the undesirable contact over the predetermined period; and
  display the anticipated location to the user.

15. The system of claim 14, the location information of the undesirable contact determined at least in part based on a location signal from the undesirable contact.

16. The system of claim 14, the location information of the undesirable contact determined at least in part based on social network postings of the undesirable contact.

17. The system of claim 14, the potential undesirable encounter determined at least in part based on analysis of the anticipated locations of the user and the anticipated locations of the undesirable contact over the predetermined period.

18. The system of claim 17, the analysis comprising a determination of a potential overlap of at least one anticipated location of the user and at least one anticipated location of the undesirable contact over the predetermined period.

19. The system of claim 14, the one or more computer-executable instructions further executable by the one or more processors to send a notification to a mobile device of the user suggesting an alternative schedule for the user, based at least in part on the potential undesirable encounter.

20. The system of claim 19, the alternative schedule comprising an alternative time to visit the anticipated location.

* * * * *